United States Patent
Kaneta et al.

(10) Patent No.: US 10,059,398 B2
(45) Date of Patent: Aug. 28, 2018

(54) STRADDLE-TYPE VEHICLE

(71) Applicant: HONDA MOTOR CO., LTD., Tokyo (JP)

(72) Inventors: Hiroyuki Kaneta, Wako (JP); Kazunari Iguchi, Wako (JP); Shunichi Miyagishi, Wako (JP); Yotaro Mori, Wako (JP); Yuichi Uebayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 73 days.

(21) Appl. No.: 15/263,371

(22) Filed: Sep. 13, 2016

(65) Prior Publication Data

US 2017/0088232 A1 Mar. 30, 2017

(30) Foreign Application Priority Data

Sep. 30, 2015 (JP) .................................. 2015-194310

(51) Int. Cl.
| | |
|---|---|
| *B62K 25/08* | (2006.01) |
| *B62L 1/00* | (2006.01) |
| *B62K 5/027* | (2013.01) |
| *B62K 5/08* | (2006.01) |
| *B62K 5/05* | (2013.01) |

(Continued)

(52) U.S. Cl.
CPC .............. *B62K 25/08* (2013.01); *B62K 5/027* (2013.01); *B62K 5/05* (2013.01); *B62K 5/08* (2013.01); *B62K 5/10* (2013.01); *B62L 1/005* (2013.01); *B62J 2099/002* (2013.01); *B62J 2300/002* (2013.01)

(58) Field of Classification Search
CPC .......... B62K 25/08; B62K 5/027; B62K 5/05; B62K 5/08; B62K 5/10; B62J 2099/002
See application file for complete search history.

(56) References Cited

U.S. PATENT DOCUMENTS 6,492,805 B1 * 12/2002 Wakabayashi .......... B60T 1/065
                                                  324/160
7,322,437 B2 * 1/2008 Toyoda .................... B62J 99/00
                                                  180/219

(Continued)

FOREIGN PATENT DOCUMENTS

JP            4059996 B2    6/2000

*Primary Examiner* — Joseph M Rocca
*Assistant Examiner* — Michael R Stabley
(74) *Attorney, Agent, or Firm* — Mori & Ward, LLP (57) ABSTRACT

An axle extends in an axial direction. A front wheel is rotatable around a wheel rotational axis. A front wheel supporting arm rotatably supports the axle. A front fork swingably supports the front wheel supporting arm such that the front wheel supporting arm is rotatable in a first direction about the wheel rotational axis. A rotary member is rotatable together with the axle around the wheel rotational axis. An axle rotation detector is supported on the axle opposite to the rotary member in the axial direction to be rotatable around the wheel rotational axis to detect a difference between rotational speeds of the axle rotation detector and the rotary member. A link mechanism is provided between the axle rotation detector and the front fork to turn the axle rotation detector in a second rotational direction opposite to the first rotational direction about the wheel rotational axis.

12 Claims, 6 Drawing Sheets

(51) Int. Cl.
*B62K 5/10* (2013.01)
*B62J 99/00* (2009.01)

(56) References Cited

U.S. PATENT DOCUMENTS

| | | | | |
|---|---|---|---|---|
| 7,460,936 | B2* | 12/2008 | Fulks | B60G 17/0162 |
| | | | | 60/600 |
| 7,658,256 | B2* | 2/2010 | Kobayashi | B60R 21/013 |
| | | | | 180/274 |
| 8,123,240 | B2* | 2/2012 | Mercier | B62D 9/02 |
| | | | | 280/124.103 |
| 8,762,003 | B2* | 6/2014 | Mercier | B60G 17/0157 |
| | | | | 180/210 |
| 8,991,543 | B2* | 3/2015 | Nagakubo | B62K 19/38 |
| | | | | 180/219 |
| 2006/0066294 | A1* | 3/2006 | Ishida | B60T 8/3225 |
| | | | | 324/166 |
| 2015/0259027 | A1* | 9/2015 | Takano | B62K 5/05 |
| | | | | 280/267 |
| 2016/0229480 | A1* | 8/2016 | Mori | B62D 9/02 |
| 2016/0264110 | A1* | 9/2016 | Seto | B60T 8/1755 |
| 2016/0280192 | A1* | 9/2016 | Seto | B60T 8/1706 |
| 2016/0280193 | A1* | 9/2016 | Seto | B60T 8/1706 |
| 2016/0347295 | A1* | 12/2016 | Seto | B60T 8/246 |

* cited by examiner

STRADDLE-TYPE VEHICLE

CROSS-REFERENCE TO RELATED APPLICATIONS

The present application claims priority under 35 U.S.C. § 119 to Japanese Patent Application No. 2015-194310, filed Sep. 30, 2015. The contents of this application are incorporated herein by reference in their entirety.

BACKGROUND OF THE INVENTION

Field of the Invention
The present invention relates to a straddle-type vehicle.
Discussion of the Background
Japanese Patent No. 4059996 discloses a motorcycle in which a front wheel supporting arm that axially supports the axle of a front wheel and a brake bracket are swingable independently of each other.

SUMMARY OF THE INVENTION

According to one aspect of the present invention, in a straddle-type vehicle in which: a front wheel is suspended on a front fork by a bottom link suspension having a front wheel supporting arm that axially supports an axle of the front wheel and is swingably supported on the front fork; and a brake bracket on which a brake caliper is mounted is connected to the front fork so as to be swingable independently of the front wheel supporting arm, a rotary member that is designed to rotate together with the axle is fixed on the axle, an axle rotation measuring unit that constitutes a wheel speed sensor in collaboration with the rotary member and is configured to detect a difference in turning between the axle rotation measuring unit itself and the rotary member is turnably supported on the axle at a position opposite the rotary member, and a link mechanism that is configured to turn the axle rotation measuring unit, in response to turning of the front wheel supporting arm, about an axis of the axle and in a direction opposite a direction the front wheel supporting arm turns is provided between the axle rotation measuring unit and the front fork.

According to another aspect of the present invention, a straddle-type vehicle includes an axle, a front wheel, a front wheel supporting arm, a front fork, a rotary member, an axle rotation detector, and a link mechanism. The axle has a wheel rotational axis and extends in an axial direction. The front wheel is supported by the axle to be rotatable around the wheel rotational axis. The front wheel supporting arm rotatably supports the axle. The front fork swingably supports the front wheel supporting arm such that the front wheel supporting arm is rotatable in a first direction about the wheel rotational axis. The rotary member is attached to the axle to be rotatable together with the axle around the wheel rotational axis. The axle rotation detector is supported on the axle opposite to the rotary member in the axial direction to be rotatable around the wheel rotational axis to detect a difference between a rotational speed of the axle rotation detector and a rotational speed of the rotary member to detect a wheel speed. The link mechanism is provided between the axle rotation detector and the front fork to turn the axle rotation detector in a second rotational direction opposite to the first rotational direction about the wheel rotational axis.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Hereinbelow, an embodiment of the present invention is described with reference to FIGS. 1 to 6. Note that, throughout the following description, directional terms such as front, rear, up, down, left, and right indicate those directions seen by a rider riding a motor tricycle with front two wheels.

Figure 1:
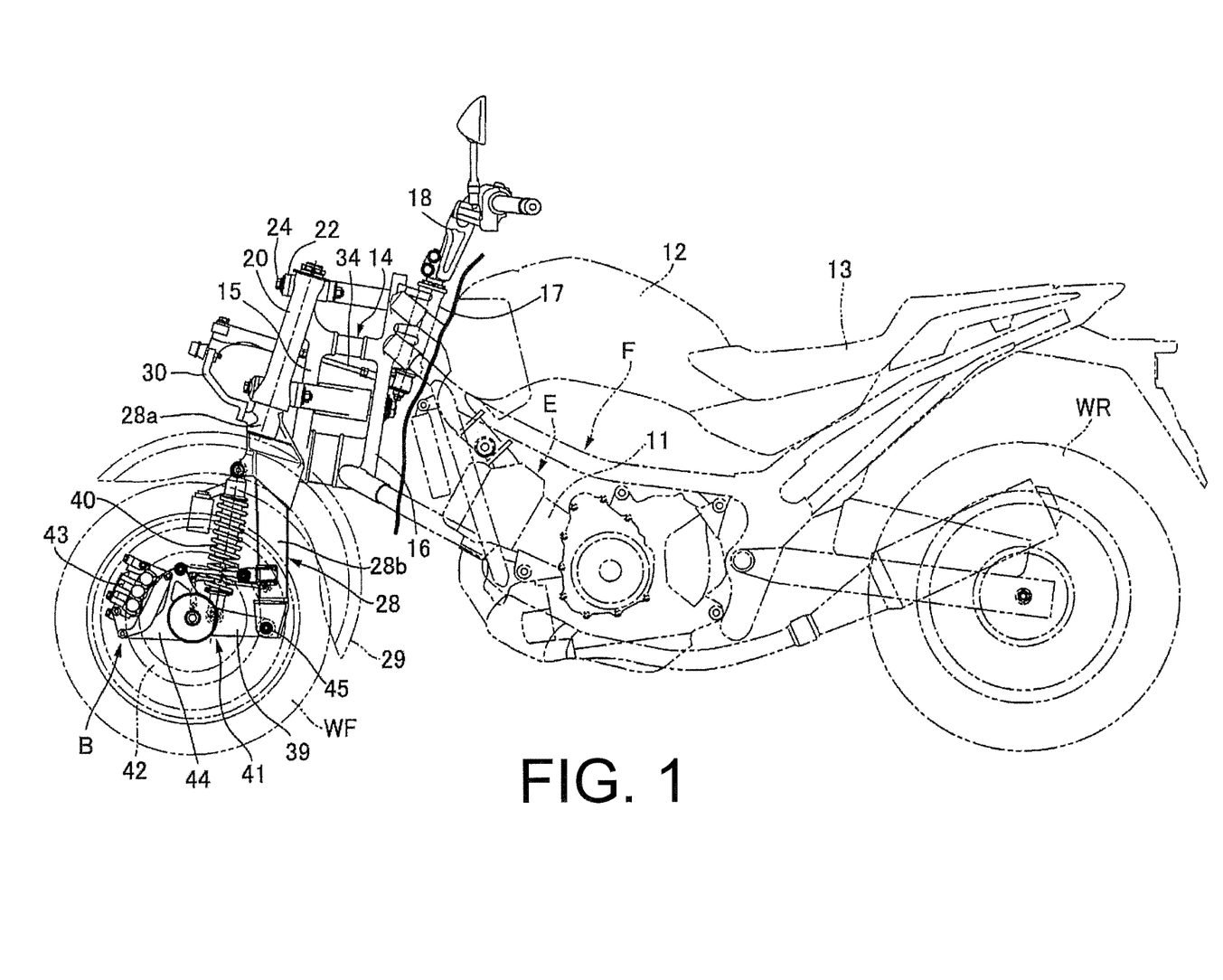
FIG. 1 is a left side view of a motor tricycle with front two wheels.

First, in FIG. 1, this straddle-type vehicle is a motor tricycle with front two wheels having a pair of left and right front wheels WF. A body frame F of this vehicle is equipped, in its intermediate part in a longitudinal direction with respect to the vehicle, with an engine body 11 of an engine E configured to drive a rear wheel WR, and a fuel tank 12 disposed above the engine body 11 and a riding seat 13 disposed behind the fuel tank 12 are supported by the body frame F.

Figure 2:
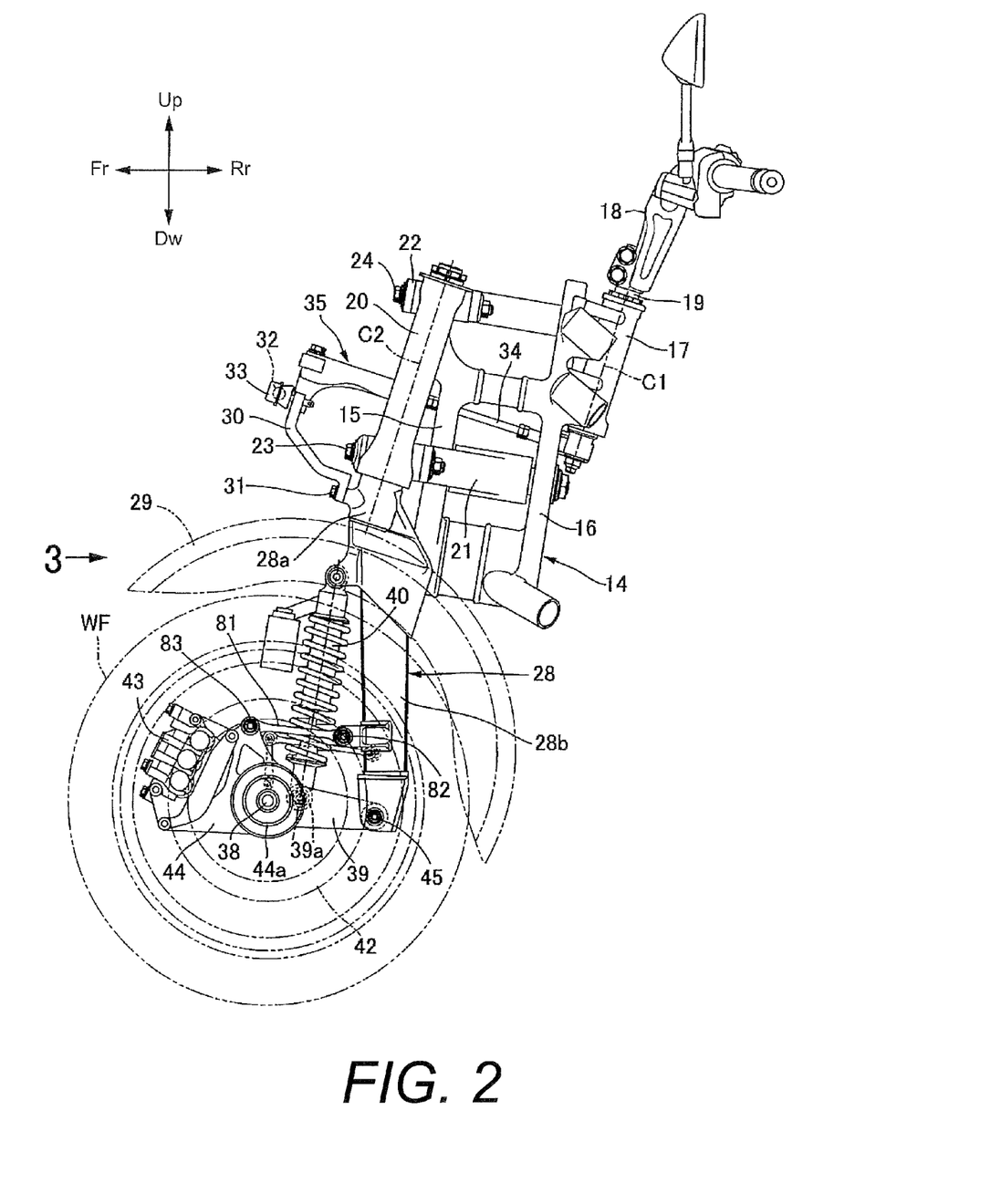
FIG. 2 is an enlarged view of a main part of FIG. 1.
Figure 3:
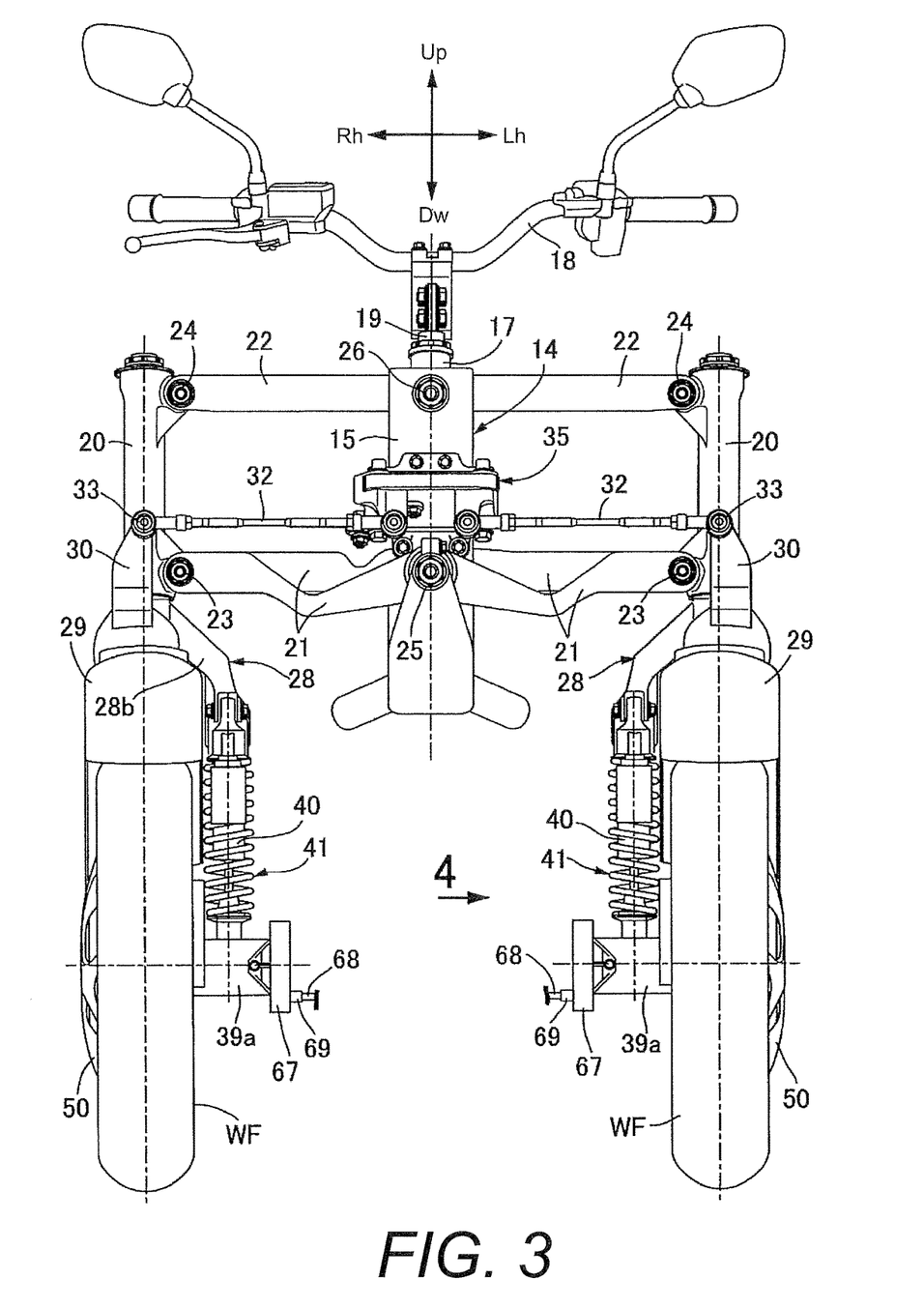
FIG. 3 is a view of FIG. 2 as seen in the direction of the arrow 3.

Referring also to FIGS. 2 and 3, a front frame 14 included in the body frame F in its front end part has: a front vertical frame portion 15 that extends in a vertical direction; a rear vertical frame portion 16 that extends in the vertical direction behind the front vertical frame portion 15 in the longitudinal direction with respect to the vehicle and continues integrally from the front vertical frame portion 15; and a handlebar supporting tube 17 that continues integrally from a rear upper part of the rear vertical frame portion 16 and extends vertically with an axis C1 tilting slightly rearward, and a steering shaft 19 that continues integrally from a steering handlebar 18 is steerably supported on the handlebar supporting tube 17.

At left and right sides of a front part of the front frame 14, a pair of fork supporting tubes 20 each having an axis C2 parallel with the axis C1 of the handle supporting tube 17 is arranged to be located above the front wheels WF. Lower arm members 21 extending in a vehicle widthwise direction are turnably connected, at their outer end parts in the vehicle widthwise direction, to lower parts of the fork supporting tubes 20 respectively via first connecting shafts 23 each having an axis extending in the longitudinal direction with respect to the vehicle, and upper arm members 22 extending in the vehicle widthwise direction are turnably connected, at their outer end parts in the vehicle widthwise direction, to upper parts of the fork supporting tubes 20 respectively via second connecting shafts 24 each having an axis extending in the longitudinal direction with respect to the vehicle. In addition, inner end parts in the vehicle widthwise direction of the lower arm members 21 and inner end parts in the vehicle widthwise direction of the upper arm members 22 are turnably connected to the front frame 14 via third and fourth connecting shafts 25, 26 each having an axis parallel with the first and second connecting shafts 23, 24.

Front forks 28 are steerably supported on the paired left and right fork supporting tubes 20 respectively. Each front fork 28 is formed to have: a turning supported portion 28a that is inserted in the fork supporting tube 20 and steerably supported on the fork supporting tube 20; and a support leg portion 28b that extends vertically inside the front wheel WF in the vehicle widthwise direction and continues integrally from the turning supported portion 28a so as to support the front wheel WF, and a front fender 29 covering the front wheel WF from above is attached to a connection part between the turning supported portion 28a and the support leg portion 28b.

Connecting plates 30 extending upward in front of the fork supporting tubes 20 in the longitudinal direction with respect to the vehicle are respectively fastened, with bolts 31, to lower parts of the turning supported portions 28a of the front forks 28 protruding downward from the fork supporting tubes 20, and paired left and right steering rods 32 extending in the vehicle widthwise direction are connected, at their outer end parts in the vehicle widthwise direction, to the connecting plates 30 via fifth connecting shafts 33.

Meanwhile, a steering lever 34 extending forward in the longitudinal direction with respect to the vehicle is fixed, at its rear end part, to a lower end part of the steering shaft 19 protruding downward from the handlebar supporting tube 17. A front end part of the steering lever 34 is connected to inner end parts in the vehicle widthwise direction of the paired left and right steering rods 32 via a steering mechanism 35, and the steering mechanism 35 is configured to move the paired left and right steering rods 32 to the left and right in response to the turning of the steering rods 32 together with the steering shaft 19 according to manipulation from the steering handlebar 18.

Next, the suspension structure of the front wheels WF is described. Hereinbelow, the suspension structure of the left front wheel WF is described with reference to FIGS. 4 to 6; however, since the left and right front wheels WF have the same suspension structure, parts of the right front wheel WF are simply illustrated with the same reference numerals as parts of the left front wheel WF corresponding thereto and their detailed description is omitted.

Figure 4:
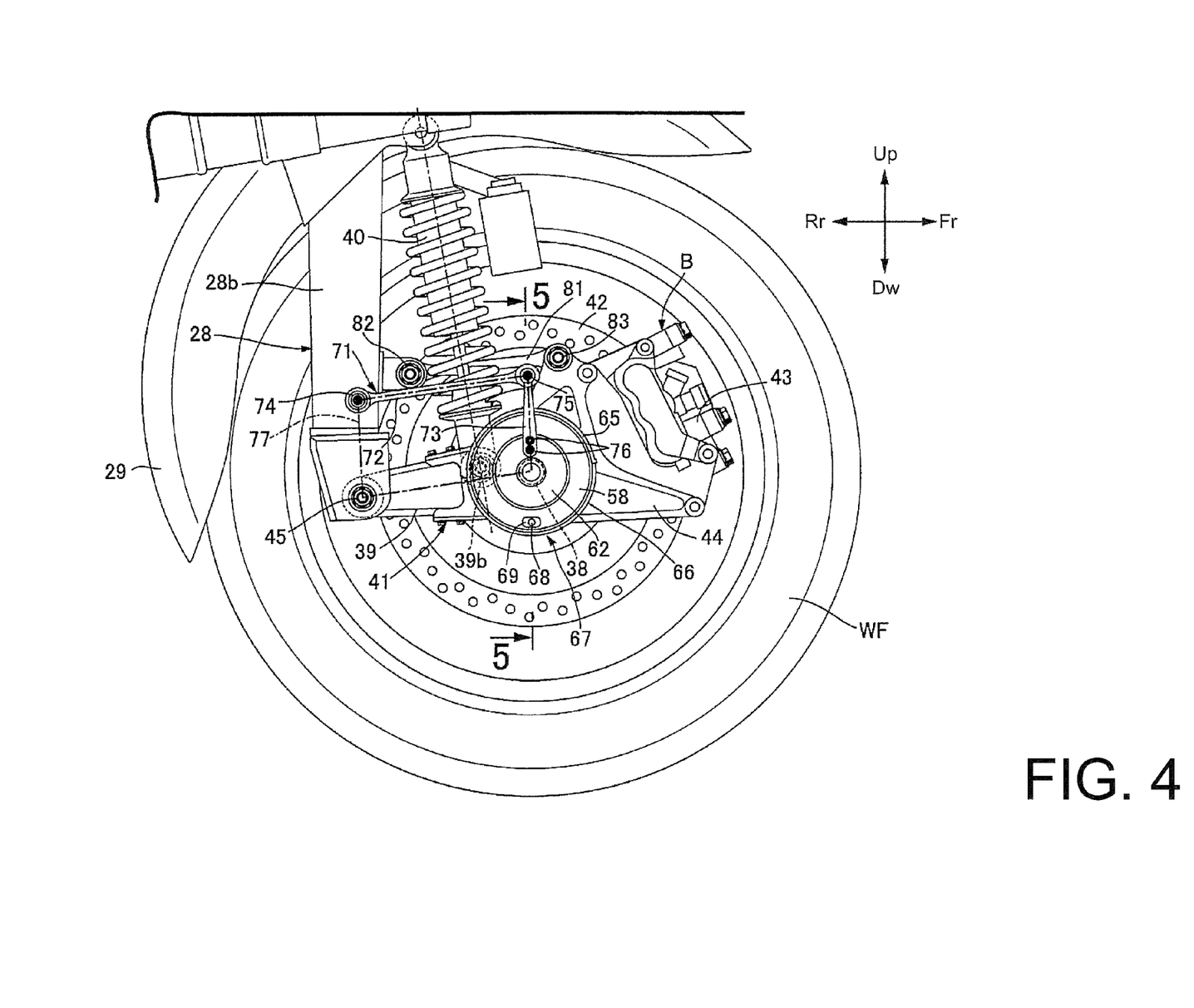
FIG. 4 is a view of FIG. 3 as seen in the direction of the arrow 4.
Figure 5:
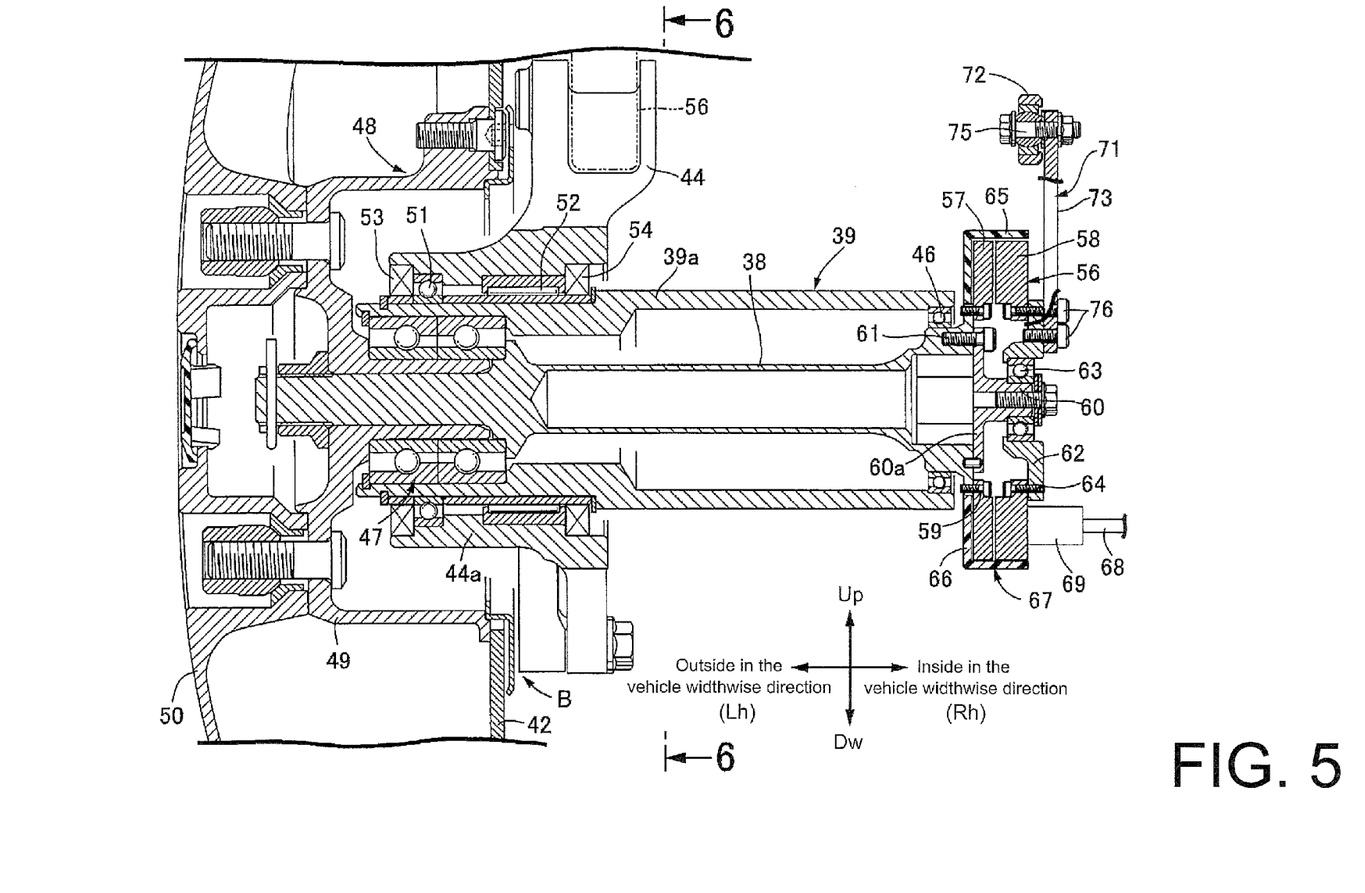
FIG. 5 is a sectional view taken along the line 5-5 in FIG. 4.
Figure 6:
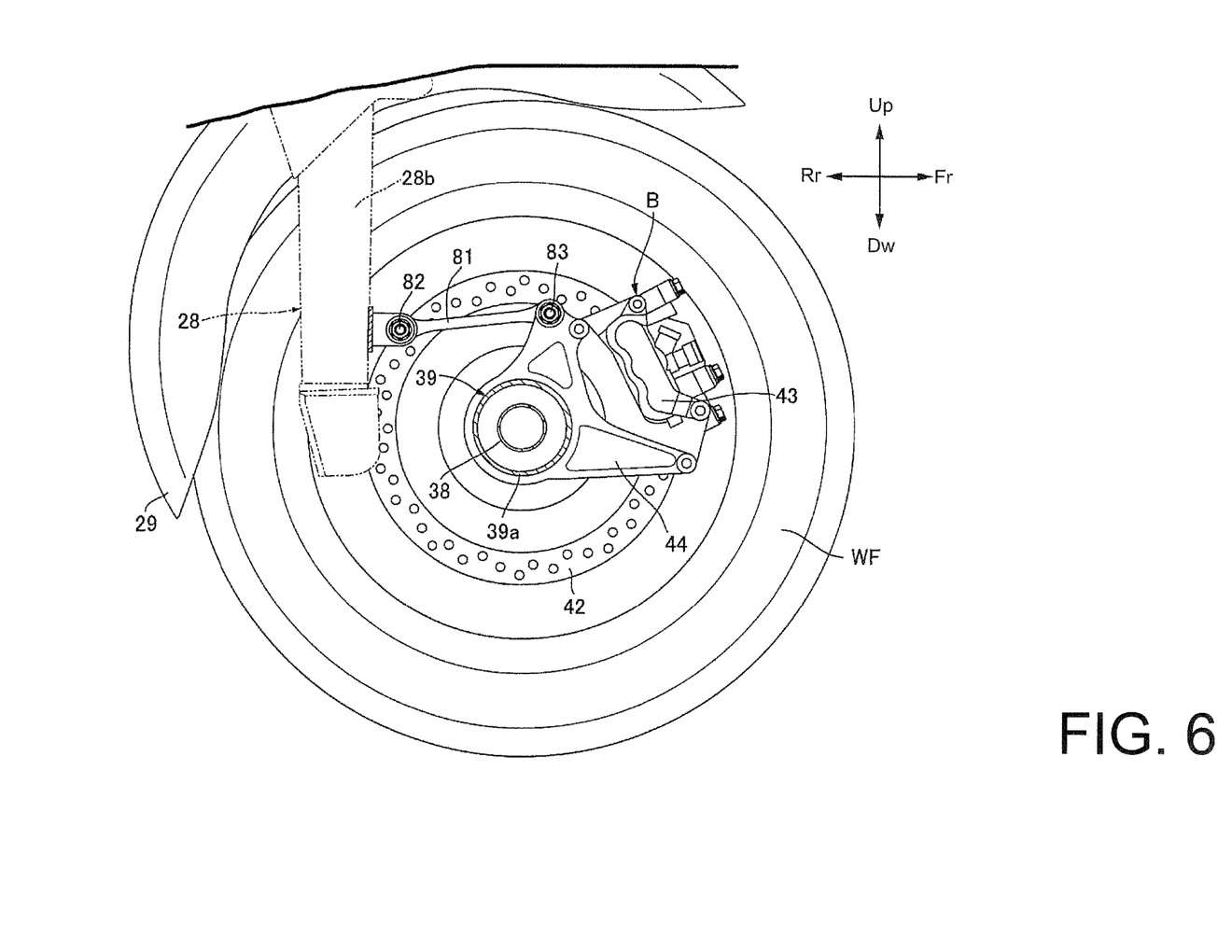
FIG. 6 is a sectional view taken along the line 6-6 in FIG. 5.

The front wheel WF is suspended on the front fork 28 by a bottom link suspension 41 having a front wheel supporting arm 39 that axially supports an axle 38 of the front wheel WF and is swingably supported on the front fork 28. In addition, the front wheel WF is equipped with a disc brake B including a brake disc 42 designed to rotate together with the front wheel WF, and a brake caliper 43 of the disc brake B is mounted on a brake bracket 44 that is connected to the front fork 28 so as to be swingable independently of the front wheel supporting arm 39.

The front wheel supporting arm 39 extends in the longitudinal direction with respect to the vehicle, and a rear end part of the front wheel supporting arm 39 in the longitudinal direction with respect to the vehicle is swingably supported on a lower end part of the support leg portion 28b of the front fork 28 via a first spindle 45 having an axis extending in the vehicle widthwise direction. In addition, the front wheel supporting arm 39 is integrally provided, at its front end part in the longitudinal direction with respect to the vehicle, with an axle supporting tubular portion 39a that coaxially surrounds the axle 38, a ball bearing 46 is interposed between the axle 38 and an inner end part in the vehicle widthwise direction of the axle supporting tubular portion 39a, and a double row angular ball bearing 47 is interposed between the axle 38 and an outer end part in the vehicle widthwise direction of the axle supporting tubular portion 39a. In other words, the axle 38 is axially supported on a front end part of the front wheel supporting arm 39 whose rear end part is swingably supported on the lower end part of the front fork 28.

A hub 49 of a wheel 48 constituting a part of the front wheel WF is fixed on an outer end part in the vehicle widthwise direction of the axle 38, the brake disc 42 is fixed on the hub 49, and a wheel cap 50 covering the wheel 48 from the outside in the vehicle widthwise direction is attached to the hub 49.

In addition, the brake bracket 44 integrally has a cylindrical portion 44a that coaxially covers the outer end part in the vehicle widthwise direction of the axle supporting tubular portion 39a. A ball bearing 51 and a roller bearing 52 are interposed between the cylindrical portion 44a and the axle supporting tubular portion 39a, and annular sealing members 53, 54 that pinch the ball bearing 51 and the roller bearing 52 between them are also interposed therebetween. Further, a supporting arm 81 extending in the longitudinal direction with respect to the vehicle is turnably connected, at its rear end part, to an intermediate part in the vertical direction of the support leg portion 28b of the front fork 28 via a connecting shaft 82 disposed above the first spindle 45, and a front end part of the supporting arm 81 is connected to the brake bracket 44 via a connecting shaft 83 extending parallel with the connecting shaft 82. In other words, the brake bracket 44 is swingable about the axis of the axle 38 independently of the front wheel supporting arm 39.

Meanwhile, the bottom link suspension 41 includes, in addition to the front wheel supporting arm 39, a cushion unit 40 that is provided between the front fork 28 and a cushion supporting portion 39b, provided in the front wheel supporting arm 39 at a position behind the axle 38 in the longitudinal direction with respect to the vehicle, and configured to receive force generated by the rocking of the vehicle and vertical force on the axle 38 and, as clearly illustrated in FIG. 4, the brake caliper 43 is mounted on the brake bracket 44 so as to be located ahead of the axle 38 in the longitudinal direction with respect to the vehicle.

The wheel speed of the front wheel WF is detected by a wheel speed sensor 56, and the wheel speed sensor 56 is constituted of: a rotary member 57 that is design to rotate together with the axle 38; and an axle rotation measuring unit (an axle rotation detector) 58 that is configured to detect a difference in turning between itself and the rotary member 57.

The rotary member 57 is formed in the shape of a ring coaxially with the axle 38, and is fastened to an inner end part in the vehicle widthwise direction of the axle 38 with multiple bolts 59. In addition, a flange portion 60a of a support tube 60 coaxial with the axle 38 is fastened, with multiple bolts 61, to the inner end part of the axle 38 at a position radially inward of the rotary member 57.

The axle rotation measuring unit 58 is formed in the shape of a ring so as to become adjacent to and opposed to the rotary member 57 from the inner side in the vehicle widthwise direction, and an inner circumferential part of the axle rotation measuring unit 58 is fastened, with multiple bolts 64, to an outer circumferential part of a ring-shaped support member 62 having a ball bearing 63 interposed between itself and the support tube 60. In other words, the axle rotation measuring unit 58 is turnable about the axis of the axle 38.

An outer end part in the vehicle widthwise direction of the rotary member 57 and the outer circumferences of the rotary member 57 and the axle rotation measuring unit 58 are covered with a cover 67 constituted of a pair of half members 65, 66, and the half members 65, 66 are each detachably attached to the front wheel supporting arm 39. In addition, a connector 69 that leads to a lead wire 68 is detachably attached to the axle rotation measuring unit 58.

A link mechanism 71 that is configured to turn the axle rotation measuring unit 58, in response to the turning of the front wheel supporting arm 39, about the axis of the axle 38 and in the direction opposite the direction of the front wheel supporting arm 39 turns is provided between the axle rotation measuring unit 58 and the front fork 28.

The link mechanism 71 is composed of: a first link 72 that has one end part turnably supported on the support leg portion 28b of the front fork 28; and a second link 73 that has one end part turnably connected to the other end part of the first link 72 and the other end part connected to the axle rotation measuring unit 58.

One end part of the first link 72 is turnably supported on the support leg portion 28b via a second spindle 74 that is disposed above the first spindle 45 and below the connecting shaft 55, and the other end part of the first link 72 and one end part of the second link 73 are connected to each other via a connecting shaft 75. The second link 73 is disposed on a line joining the connecting shaft 75 and the axis of the axle 38 as seen in the side view of the vehicle, and the other end part of the second link 73 is fastened, with a pair of bolts 76, to the support member 62 to which the axle rotation measuring unit 58 is fastened.

Besides, a quadrilateral 77 obtained by joining, in the side view of the vehicle: the axis of the second spindle 74 that turnably supports the first link 72 on the front fork 28; the axis of the connecting shaft 75 that turnably connects the first and second links 72, 73 to each other; the axis of the first spindle 45 that supports the front wheel supporting arm 39 on the front fork 28 separately from the second spindle 74; and the center of turn of the axle rotation measuring unit 58, i.e., the axis of the axle 38 is a parallelogram.

Next, the operation of this embodiment is described. The rotary member 57 that is designed to rotate together with the axle 38 of the front wheel WF is fixed on the axle 38, the axle rotation measuring unit 58 that constitutes the wheel speed sensor 56 in collaboration with the rotary member 57 and is configured to detect a difference in turning between itself and the rotary member 57 (a difference between its rotational speed and a rotational speed of the rotary member 57) is turnably supported on the axle 38 at a position opposite the rotary member 57, and the link mechanism 71 that is configured to turn the axle rotation measuring unit 58, in response to the turning of the front wheel supporting arm 39, about the axis of the axle 38 and in the direction opposite the direction of the front wheel supporting arm 39 turns is provided between the axle rotation measuring unit 58 and the front fork 28. Thereby, even when the front wheel supporting arm 39 turns, accuracy in wheel speed detection by the wheel speed sensor 56 can be inhibited from being deteriorated. Specifically, if the axle rotation measuring unit 58 is simply mounted on the front wheel supporting arm 39, the axle rotation measuring unit might detect the wheel speed according to the turning speed of the front wheel supporting arm 39 while the front wheel supporting arm 39 is turning; however, since the axle rotation measuring unit 58 is turnably supported on the axle 38 and the axle rotation measuring unit 58 is turned in the direction opposite the turning direction of the front wheel supporting arm 39 by the link mechanism 71 provided between the axle rotation measuring unit 58 and the front fork 28, accuracy in wheel speed detection by the wheel speed sensor 56 can be inhibited from being deteriorated.

In addition, the link mechanism 71 is composed of: the first link 72 that has one end part turnably supported on the front fork 28; and the second link 73 that has one end part turnably connected to the other end part of the first link 72 and the other end part connected to the axle rotation measuring unit 58. Thereby, it is possible to smoothly convert the swing of the front wheel supporting arm 39 into the turning of the axle rotation measuring unit 58.

Further, the quadrilateral 77 obtained by joining, in the side view of the vehicle: the axis of the second spindle 74 that turnably supports the first link 72 on the front fork 28; the axis of the connecting shaft 75 that turnably connects the first and second links 72, 73 to each other; the axis of the first spindle 45 that supports the front wheel supporting arm 39 on the front fork 28 separately from the second spindle 74; and the center of turn of the axle rotation measuring unit 58, i.e., the axis of the axle 38 is a parallelogram. Thereby, the first link 72, the second link 73 and the axle rotation measuring unit 58, the front wheel supporting arm 39, and the front fork 28 constitute the links of the parallelogram, and thus the relative position relation between the rotary member 57 and the axle rotation measuring unit 58 is not changed by the turning of the front wheel supporting arm 39, enabling accurate detection of wheel speed.

The embodiment of the present invention has been described above. However, the present invention is not limited to what is described in the above embodiment, and various design changes may be made without departing from the present invention described in the scope of claims.

For example, while the motor tricycle with front two wheels has been described in the above embodiment, the present invention is applicable to motorcycles.

In order to achieve the above objective, a first aspect of the present invention is characterized in that, in a straddle-type vehicle in which: a front wheel is suspended on a front fork by a bottom link suspension having a front wheel supporting arm that axially supports an axle of the front wheel and is swingably supported on the front fork; and a brake bracket on which a brake caliper is mounted is connected to the front fork so as to be swingable independently of the front wheel supporting arm, a rotary member that is designed to rotate together with the axle is fixed on the axle, an axle rotation measuring unit that constitutes a wheel speed sensor in collaboration with the rotary member and is configured to detect a difference in turning between the axle rotation measuring unit itself and the rotary member is turnably supported on the axle at a position opposite the rotary member, and a link mechanism that is configured to turn the axle rotation measuring unit, in response to turning of the front wheel supporting arm, about an axis of the axle and in a direction opposite a direction the front wheel supporting arm turns is provided between the axle rotation measuring unit and the front fork.

Further, a second aspect of the present invention is characterized in that, in addition to the configuration of the first aspect, the link mechanism is composed of: a first link that has one end part turnably supported on the front fork; and a second link that has one end part turnably connected to the other end part of the first link and the other end part connected to the axle rotation measuring unit.

Further, a third aspect of the present invention is characterized in that, in addition to the configuration of the second aspect, a quadrilateral obtained by joining, in a side view of the vehicle: an axis of a spindle that turnably supports the first link on the front fork; an axis of a connecting shaft that turnably connects the first and second links to each other; an axis of another spindle that supports the front wheel supporting arm on the front fork separately from the spindle; and the center of turn of the axle rotation measuring unit is a parallelogram.

According to the first aspect of the present invention, the wheel speed sensor is constituted of: the rotary member that is fixed on the axle so as to rotate together with the axle; and the axle rotation measuring unit that is opposed to the rotary member. If the axle rotation measuring unit is simply mounted on the front wheel supporting arm, the axle rotation measuring unit might detect the wheel speed according to the turning speed of the front wheel supporting arm while the front wheel supporting arm is turning; however, since the axle rotation measuring unit is turnably supported on the axle and the axle rotation measuring unit is turned in the direction opposite the turning direction of the front wheel supporting arm by the link mechanism provided between the axle rotation measuring unit and the front fork, accuracy in wheel speed detection by the wheel speed sensor can be inhibited from being deteriorated even when the front wheel supporting arm turns.

Further, according to the second aspect of the present invention, the link mechanism is constituted of the first and second links that are turnable relative to each other. Thereby, it is possible to smoothly convert the swing of the front wheel supporting arm into the turning of the axle rotation measuring unit.

Further, according to the third aspect of the present invention, the first link of the link mechanism, the second link of the link mechanism and the axle rotation measuring unit, the front wheel supporting arm, and the front fork constitute the links of the parallelogram, and thus the relative position relation between the rotary member and the axle rotation measuring unit is not changed by the turning of the front wheel supporting arm, enabling accurate detection of wheel speed.

Obviously, numerous modifications and variations of the present invention are possible in light of the above teachings. It is therefore to be understood that within the scope of the appended claims, the invention may be practiced otherwise than as specifically described herein.

What is claimed is:

1. A straddled vehicle in which: a front wheel is suspended on a front fork by a bottom link suspension having a front wheel supporting arm that axially supports an axle of the front wheel and is swingably supported on the front fork; and a brake bracket on which a brake caliper is mounted is connected to the front fork so as to be swingable independently of the front wheel supporting arm, wherein
   a rotary member that is designed to rotate together with the axle is fixed on the axle,
   an axle rotation measuring unit that constitutes a wheel speed sensor in collaboration with the rotary member and is configured to detect a difference in turning between the axle rotation measuring unit itself and the rotary member is turnably supported on the axle at a position opposite the rotary member, and
   a link mechanism that is configured to turn the axle rotation measuring unit, in response to turning of the front wheel supporting arm, about an axis of the axle and in a direction opposite a direction the front wheel supporting arm turns is provided between the axle rotation measuring unit and the front fork.

2. The straddled vehicle according to claim 1, wherein the link mechanism is composed of: a first link that has one end part turnably supported on the front fork; and a second link that has one end part turnably connected to the other end part of the first link and the other end part connected to the axle rotation measuring unit.

3. The straddled vehicle according to claim 2, wherein a quadrilateral obtained by joining, in a side view of the vehicle: an axis of a spindle that turnably supports the first link on the front fork; an axis of a connecting shaft that turnably connects the first and second links to each other; an axis of another spindle that supports the front wheel supporting arm on the front fork separately from the spindle; and the center of turn of the axle rotation measuring unit is a parallelogram.

4. The straddled vehicle according to claim 1, wherein the straddled vehicle is a motor tricycle.

5. The straddled vehicle according to claim 1, wherein the straddled vehicle is a motorcycle.

6. A straddled vehicle comprising:
   an axle having a wheel rotational axis and extending in an axial direction;
   a front wheel supported by the axle to be rotatable around the wheel rotational axis;
   a front wheel supporting arm rotatably supporting the axle;
   a front fork swingably supporting the front wheel supporting arm such that the front wheel supporting arm is rotatable in a first direction about the wheel rotational axis;
   a rotary member attached to the axle to be rotatable together with the axle around the wheel rotational axis;
   an axle rotation detector supported on the axle opposite to the rotary member in the axial direction to be rotatable around the wheel rotational axis to detect a difference between a rotational speed of the axle rotation detector and a rotational speed of the rotary member to detect a wheel speed; and
   a link mechanism provided between the axle rotation detector and the front fork to turn the axle rotation detector in a second rotational direction opposite to the first rotational direction about the wheel rotational axis.

7. The straddled vehicle according to claim 6, the link mechanism comprising:
   a first link comprising:
     a first end part turnably supported on the front fork around a first rotational axis; and
     a second end part opposite to the first end part viewed in the first rotational axis; and
   a second link comprising:
     a third end part turnably connected to the second end part of the first link around the second rotational axis parallel to the first rotational axis; and
     a fourth end part which is opposite to the third end part viewed in the second rotational axis and which is connected to the axle rotation detector.

8. The straddled vehicle according to claim 7, further comprising:
   a first spindle turnably supporting the first link on the front fork;
   a connecting shaft turnably connecting the first link and the second link; and
   a second spindle supporting the front wheel supporting arm on the front fork separately from the first spindle, wherein:
     the first rotational axis is an axis of the first spindle, the second rotational axis is an axis of the connecting shaft, and a quadrilateral obtained by joining the first rotational axis, the second rotational axis, an axis of the second spindle, and a rotational center of the axle rotation detector is a parallelogram viewed in the first rotational axis.

9. The straddled vehicle according to claim 6, further comprising:

a brake caliper; and a brake bracket on which the brake caliper is mounted, wherein the front fork swingably supports the brake bracket independently of the front wheel supporting arm.

10. The straddled vehicle according to claim 9, further comprising:

a bottom link suspension including the front wheel supporting arm.

11. The straddled vehicle according to claim 6, wherein the straddled vehicle is a motor tricycle.

12. The straddled vehicle according to claim 6, wherein the straddled vehicle is a motorcycle.

\* \* \* \* \*